Jan. 9, 1962 R. S. ARIES 3,016,291
PURE SILICON BY HYDROGEN REDUCTION
Filed April 15, 1959
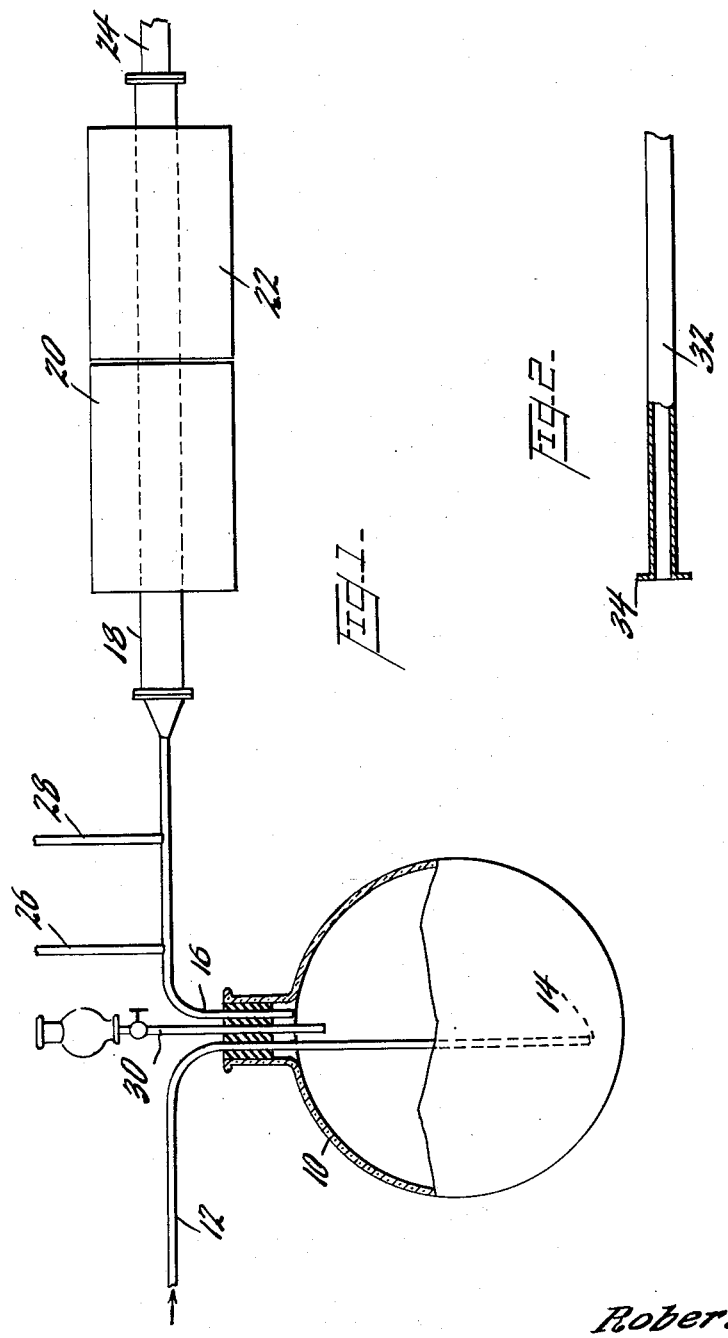
INVENTOR
Robert S. Aries,
BY Hugo E. Neuberger
ATTORNEY

United States Patent Office 3,016,291
Patented Jan. 9, 1962

3,016,291
PURE SILICON BY HYDROGEN REDUCTION
Robert S. Aries, 77 South St., Stamford, Conn.
Filed Apr. 15, 1959, Ser. No. 806,722
10 Claims. (Cl. 23—223.5)

This invention relates to high purity silicon and to a novel method for its production. More particularly, the invention relates to the production of very high purity silicon by the reduction of silicon halides at elevated temperatures with hydrogen, alone or in admixture with an inert gas. This application is a continuation-in-part of my application Serial No. 670,991, filed July 10, 1957, now abandoned.

Current developments in the electronics industry have developed a demand for high purity silicon, also known as hyper-pure silicon, to be used as a semi-conductor material. High purity in the case of elemental silicon to be used in transistors, rectifiers and solar batteries and instrument components is of a different order than purity as customarily required and defined in the chemical reagents used in the chemical processing industries. Thus, for example, one of the purest metals available is zinc. The "Special High Grade" zinc contains a maximum of 0.01% lead, iron and cadmium, i.e., the zinc is 99.99% pure. Certain grades of electrolytic zinc (commanding a small premium) are guaranteed to be 99.999% zinc, and this, by all usual standards, may be considered to be of extremely high purity.

The super high purity silicon for transistor use, for example, should be 99.999999% actual silicon content, and the amount of certain specific impurities (boron, for example) should be considerably less than the approximately 0.000001% total impurities allowable in semiconductor grade silicon. Even in such products as pharmaceuticals which require an extremely high degree of purity, limitations on lead, arsenic, etc., as impurities are much less stringent than in the case of impurities in semiconductor grade silicon. It becomes apparent that the designation of this form of elemental silicon as super high purity silicon is justified by the facts.

Many methods have been proposed for the production of silicon but the high degree of purity required in the product has tended to focus attention on the use of raw materials containing silicon compounds in a state of high purity. For example, silicon tetraiodide has been prepared and purified by crystallization, and the vapor of the pure product has been subjected to high temperatures provided by a hot wire of a relatively inert metal, tungsten, for example, which causes thermal decomposition of the compound of silicon and iodine into elemental silicon and elemental iodine. Owing to the enormous difference in volatility of silicon and of iodine, the iodine vapor diffuses away from the space near the heated wire and the silicon is deposited thereon and may grow to form a substantial crystalline mass. When the growth has reached a certain stage the cooled mass of crystalline silicon must be cut in layers from the imbedded wire, with which moreover it may have alloyed or reacted to form a silicide, at least at the surface. Other methods of preparation of elemental silicon include the reaction of superheated silicon tetrachloride of high purity with highly heated vapor of the purest obtainable zinc, causing an interaction of the zinc vapor with the silicon tetrachloride to form zinc chloride and elemental silicon which grows on fortuitous crystalline nuclei to give crystalline elemental silicon which under suitable conditions will be at least in part of adequately high purity. Many other methods have been proposed, and some have been used. The difficulty is that in every instance extremely pure raw materials must be used, and a very precise processing procedure must be followed to permit the recovery of super high purity semi-conductor grade elemental silicon. The difficulties involved are evidenced by the fact that such silicon, in spite of its production from raw materials which are relatively inexpensive, commands a current market price of considerably more than $200 per pound.

Silicon tetrachloride is considerably more stable toward high temperature than silicon tetraiodide and no commercial success has been achieved in attempts to prepare silicon by the hot wire dissociation method alone using silicon tetrachloride in place of silicon tetraiodide. However, it is possible, based on theoretical considerations, that in the presence of hydrogen the hot wire method would prove more effective, as the hydrogen would combine with the chlorine produced to yield hydrogen chloride which would remove chlorine from the reaction zone in which the reversible dissociation reaction $SiCl_4 \rightleftharpoons Si + 2Cl_2$ may be occurring. This assumption is supported by the fact that pure elemental silicon at high temperatures is attacked by, i.e. reacts with chlorine, but does not equally react with hydrogen chloride.

The reaction between $SiCl_4$ and $H_2$ may be written

$$SiCl_4 + 2H_2 \rightleftharpoons Si + 4HCl \qquad (1)$$

which indicates that the reaction is reversible. In fact it is reversible because elemental silicon at sufficiently high temperatures is attacked by HCl to undergo the reverse reaction

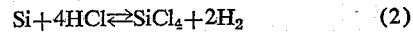

$$Si + 4HCl \rightleftharpoons SiCl_4 + 2H_2 \qquad (2)$$

In a closed equilibrium system it would require an infinite amount of hydrogen to carry the reaction completely to the right as indicated in Equation 1.

I have found, however, that in a flowing system an economically reasonable excess of hydrogen can be used to carry the reaction towards the right to sweep out the HCl as formed and to leave the solid elemental silicon as the sole reaction product. Furthermore, I have found a slow rate of reaction to be desirable to permit the growth of the solid elemental silicon in a suitable physical form as massive crystals rather than as a fine powder. In practice, even with an excess of hydrogen above the stoichiometric amount, namely a molar ratio of 2 moles hydrogen per mole of silicon tetrachloride, some silicon tetrachloride will pass through the system without having reacted. This is partly due to the fact once the deposition of elemental silicon has begun the layer or mass of such elemental silicon acts as a heat insulator and tends to lower the temperature at the reacting surfaces.

The molar ratio of hydrogen to silicon halide is critical and will range from 4 to about 8 moles of hydrogen to 1 mole of silicon halide. Thus, at the beginning of a reaction a molar ratio of 4 moles of hydrogen per mole of silicon tetrachloride (twice the stoichiometric amount) will yield conversions of 80-85%, while even with molar ratios of 8 (four times the stoichiometric amount of hydrogen) in the later stages of the reaction, considerable amounts of unchanged silicon tetrachloride will pass through, indicating that the temperature at the actual reaction sites has dropped because of the heat insulating action of the elemental silicon already formed. This can be overcome by gradually raising the imposed external temperature of the reaction vessel, or by using an annular reacting vessel consisting of concentric tubes, the annular space being heated both from the outside and from the inner tube; but I have found that as a practical matter it is most convenient to use an elongated and confined reaction zone such as a single tubular reactor, at a constant external temperature and to accept, toward the end of the reaction, a somewhat lower conversion rate. By making the reaction zone or vessel long enough and by maintaining a substantially constant ratio of hydrogen to silicon halide, namely at least 6 moles of hydrogen per mole of silicon tetrachloride (three times the stoichiometric amount) satisfactory conversions will be obtained of the order of 50% or more of theory based on Reaction 1.

The rate of flow of the reactants is adjusted to provide a residence time in the reaction zone sufficient to obtain a satisfactory conversion rate, and will depend upon the dimensions of the reaction zone. The residence time or time of contact of the reactants in the reaction zone should be adjusted to an amount sufficient to produce an economical yield, and may be of the order of 15 seconds or more, preferably at least 20–25 seconds. Thus in the example given where 37 liters of hydrogen in the saturation flask per hour are used, supplemented by 50 liters of hydrogen from the auxiliary supply, the total volume of hydrogen used is 87 liters per hour at 20° C., which expands to 407 liters per hour at 1100° C. The volume of the two inch diameter reaction tube with 48 inch effective length within the furnace is approximately 150 cubic inches, or almost 2.5 liters, so that the residence time is somewhat more than 22 seconds. At higher flows and shorter residence times the yield drops off, and lower flows and higher residence times produce higher yields on silicon tetrachloride but the economy of the process is affected adversely by the lower rate of output from the equipment.

Methods have been described in the patent literature in which a mixture of silicon tetrachloride and hydrogen is passed over a highly heated metallic filament, such as tantalum, to effect decomposition of the silicon halide. In all these methods, the hydrogen does not serve as a reducing agent for the silicon halide, but simply as a carrier or diluent to sweep out the chlorine formed in the dissociation, in some instances combining with the free chlorine to form hydrogen chloride. In these methods, pure silicon per se is not obtained. The silicon appears either as a coating on the metallic filament, from which it must be removed by delicate or awkward methods, or else the silicon diffuses into the metal of the heated filament to form a polyphase alloy system.

In accordance with the present invention, it has been found that halides of silicon may be reduced with hydrogen at elevated temperatures to form very high purity silicon directly in good yield. It has been found further that this reduction reaction may be carried out in the absence of any metal filament or metal surface serving as a heat source, and that the elemental silicon obtained can be formed directly as a readily removable deposit requiring little or no further processing, and of the highest degree of purity.

The overall reduction reaction, omitting possible intermediate steps, is illustrated by the equation:

$$SiCl_4 + 2H_2 \rightleftharpoons Si + 4HCl$$

So far as I have been able to determine, this reaction never goes to completion in the presence of stoichiometric amounts of hydrogen, but always requires a large excess of hydrogen over that indicated by the last equation, to go to completion. Even when the ratio moles $H_2$:moles $SiCl_4$ exceeds 2 which is the stoichiometric ratio by small amounts such as 2.5 the reaction cannot be brought to substantial completion. But if the ratio exceeds 4 the reaction becomes more nearly complete, exceeding 50% of the theoretical, provided the residence time in the reaction zone is sufficiently long. Even larger ratios than 4 are desirable, but the economic desirability of using very large ratios, above 6–8, provides a limiting factor. Ratios of less than 4 carry the reaction insufficiently far, and ratios above 8 impose the necessity of larger reaction volumes without, however, causing any other detrimental effect.

A great advantage of my novel process is that both silicon halide and hydrogen are extremely volatile substances which can be prepared in a state of high purity by fractional distillation under suitable conditions. Commercially available silicon tetrachloride, for example, stated to be of high purity, and which is in fact of high purity by the usual criteria for high purity in the chemical processing industries, such as 99.5%, or 99.9%, may be further purified by repeated distillation on the small scale. It is, of course, known that such redistillations as carried out in columns of not very great efficiency may be replaced by a single redistillation in a properly designed column of very high efficiency utilizing effective operating procedures which are well known in the distillation art to yield a fraction of extremely high purity. It is also known that hydrogen can be prepared of extremely high purity, except possibly for its content of noble gases which, however, are in no way detrimental to the desired reaction. Thus it is a great advantage in the preparation of elemental silicon of very high purity by my new process that the two required raw materials may be obtained in a state of enormously high purity by economically feasible procedures.

Another advantage of my new process is that the reaction by-product, hydrogen chloride, is extremely volatile and can easily be separated from the desired product, super high purity semi-conductor grade silicon. Another advantage is that equipment is commercially available in which the desired reaction can be carried out. An important aspect of my invention consists in the discovery of the precise conditions under which the reaction can be carried out effectively to yield the desired product. No doubt, numerous experiments have been carried out with these reactants, silicon tetrachloride and hydrogen, but not to my knowledge with commercially successful results, precisely because the exact operating conditions have not been previously developed.

I have also found that if hydrogen and silicon halide vapor, such as silicon tetrachloride vapor, are fully mixed, with the hydrogen present in excess of the stoichiometric amount required for the reaction, preferably at least 4 times the stoichiometric amount, and the mixture of the reactants is passed extremely slowly through a tube of pure fused quartz, preferably at approximately atmospheric pressure, the reaction will take place satisfactorily with deposition of silicon. The heating must be uniform, and when carried out in suitable fused quartz tubes these may be heated by standard electric furnaces. If the heating is not uniform the silicon formed tends to deposit more heavily in the hottest zones and finally causes the process to be terminated by plugging the reactor tube in this hot zone or "hot spot." In order to carry out the interaction successfully and to permit the growth of solid super purity silicon, for example, in a tube 2 inches in diameter the flow of the reactant gases and vapors and the resultant reaction rate must be so slow that the residence time of the mixed vapors is at least 20 seconds whereby the tube will only be substantially filled with solid product in 7 to 14 days. More rapid rates of feed will not permit the efficient building up of recoverable solid product, while slower rates are less economical.

As examples of silicon halides which may be used as starting materials for the reduction reaction with hydrogen, there may be mentioned silicon tetrachloride, silicon tetrabromide, and trichlorosilane ($SiHCl_3$).

The non-volatile liberated silicon of high purity remains in the reactor. The presence of excess hydrogen serves to drive the reaction in the desired direction, and serves further to remove the hydrogen chloride formed in the reduction physically, as well as also any unreacted silicon halide vapor. The amount of hydrogen present in relation to silicon halide will depend upon the particular halide used, and upon operating conditions and the type and form of apparatus, but it may preferably be in an amount ranging from about four to eight or more moles of hydrogen per mole of silicon halide used.

In accordance with another embodiment of the invention, the silicon halide and hydrogen are reacted in the presence of an inert gas, such as purified argon, nitrogen, or helium. In such case, a mixture of the vapors of silicon halide, hydrogen and an inert gas may be passed slowly through the reduction apparatus to provide a residence time of 15 seconds or more, preferably 20–25 seconds. The inert gas aids in removal of by-product hydrogen chloride.

The reduction reaction will ordinarily be carried out at approximately atmospheric pressure, although pressures below atmospheric or above atmospheric may also be used at proper temperatures.

The reduction reaction proceeds successfully within a temperature range of about 900° to 1200° C., and preferably within a range of about 1000 to 1100° C.

Other features of the invention will appear from the detailed description of the method and apparatus which follows. In the accompanying drawing:

FIG. 1 illustrates a form of apparatus for carrying out the reduction reaction; and FIG. 2 illustrates a metal liner for use in the apparatus of FIG. 1.

It will be understood that while the drawings illustrate a preferred form of apparatus for carrying out the reduction reaction, the method may be performed successfully in other and equivalent types of apparatus.

In the form of apparatus shown in FIG. 1, a Pyrex flask 10 is shown provided with a stopper and suitable glass connections. Liquid silicon halide may be added through inlet connection 30, which may be the stem of a dropping funnel. The flask 10 may also be made of fused quartz, or may be of any desired capacity, for example 20 liters. Inlet tube 12 serves as a source of purified dry halogen which emerges into the charge of silicon halide at outlet 14. Outlet tube 16 serves to carry the hydrogen substantially saturated with silicon halide vapor to a quartz reaction tube 18 which is set in a pair of electric resistance furnaces 20 and 22. Since it is necessary to use a large excess of hydrogen over the stoichiometric amount required it is generally not necessary that the hydrogen be actually saturated with silicon tetrachloride by having the tube outlet 14 provided with a sparger or other distributing device. The tube 14 may be made so short that it does not dip into the liquid silicon halide at all, but discharges into the vapor being given off by the liquid mass.

The reaction tube 18 is of pure fused quartz, two inches inside diameter, and 54 inches total length, of which 48 inches lies within the furnaces 20 and 22. The quartz tube 18 has flanged ends which are ground absolutely flat to make a tight fit with the flanged ends of lead-in tube 16 and vent tube 24, so that a sufficiently tight joint is provided by clamping the flat faces lightly together. The slight positive pressure within the reacting system prevents the leakage inward of any air, and since this positive pressure within the system is extremely small (normally less than 1 p.s.i.g.) there is no noticeable outward leakage of any of the gaseous or vapor contents through the flat flanged connections. The vent tube 24 carries off hydrogen chloride, excess silicon tetrachloride and hydrogen and other gases to a tower (not shown) where the acidic gases are neutralized by a downward flow of sodium carbonate solution. The undissolved vent gases go to a tall stack for dilution with ordinary stack gases from a boiler plant. I have also used the neutralized gas, which is essentially hydrogen with any added inert gases, after passing it through a sulfuric acid washer followed by a column of phosphorus pentoxide distributed in glass wool, and followed by clean glass wool alone, and have found it satisfactory to re-use in the system. In large scale operations the recovery of excess hydrogen may provide desired economies. Supply lines 26 and 28 serve to introduce supplementary hydrogen and inert gas, respectively. Metering devices may be inserted in the paths of the gas streams entering at points 12, 26 and 28, but as these are conventional they are not shown. Measurement of the temperatures of reaction tube 18 may be carried out by suitable pyrometers sheathed in fused silica; these also are not shown.

The apparatus may also employ a metal liner, such as a tantalum liner 32, flanged at one end 34, as shown in FIGURE 2. This liner, of the proper diameter, is slipped into a new fused silica reaction tube 18 of uniform diameter. Such a liner has given excellent service and has protected the fused silica tube. Examination of such a liner after ten runs, on removal from the tube and cutting it open, has shown that the original bright surface had become dulled, but was without any other visible signs of corrosion. During the run it is, of course, entirely in an atmosphere completely free of oxygen.

In practice, a battery of units essentially in parallel has been run with a common source of hydrogen and of inert gases, and leading to a common vent system; however, each unit had its own reservoir of liquid silicon halide to provide closer control of each individual operation. A battery of 12 units properly scheduled permits putting a new unit into operation each day and the removal daily of a completed charge, thus providing for more nearly continuous and uniform operation. Such a battery of a dozen units provides a uniform daily output of 3 to 4 pounds of silicon and, of course, as many batteries as may be required can be established.

While in the illustrative form apparatus shown the reaction system is heated externally by a resistance furnace, other heating means may be employed. Thus, for example, the reaction tube 18 may contain concentrically within itself a fused quartz tube containing a metal rod, so that the reaction mixture passes through the annular space between the outer tube and the inner tube, said metal being heated by induction to provide the necessary elevated temperature.

The following detailed description will serve to illustrate the novel method of the present invention, but is not to be considered as limiting.

*Example 1*

A charge of highly purified silicon halide, for example silicon tetrachloride, about 28 kilos, is placed in flask 10. The system is swept out with lamp grade dry nitrogen or argon for at least one hour while the furnaces bring the temperature of tube 18 to approximately 1000° C. When a steady state is reached, purified hydrogen is admitted through inlet tube 12 at the rate of about 37 liters per hour. It is not necessary to control the temperature of flask 10. Room temperature of about 68° F. (20° C.) is satisfactory and ordinary variations in temperature are not important. The 37 liters per hour of hydrogen are about 3.5 grams, and the silicon tetrachloride saturating the hydrogen is about 90 grams per hour. This is a molar ratio of about 3.3 of hydrogen to silicon tetrachloride and is not sufficiently high for best results. This is improved by the later addition of hydrogen to bring the total molar ratio above 6. This amount of silicon tetrachloride is stoichiometrically capable of yielding 14.8 grams of silicon per hour, or 3550 grams in a 10 day (240 hour) run. Actually about 1700–1800 grams of silicon are obtained in a 10 to 14 day run. This amount seems visually to fill the reaction tube 18. Furthermore, analysis of the effluent gas in the later stages shows an appreciable increase in the amount of unconverted silicon tetrachloride indicating that the heat transfer to the center of tube 18 has become slower. As the volume of the tube within the furnace is 144 cubic inches (2360 ml.) this is an apparent density of about 0.7–0.75 when the tube seems filled. The actual specific gravity of elemental silicon is 2.4 so that the tube is actually less than ⅓ filled when it appears visually filled.

When the gas flow is started the temperature within the reaction tube is slowly raised to 1100° C., and when the temperature has levelled out at 1100° C.±10° C., additional hydrogen is admitted through inlet 26 at the rate of about 50 liters per hour. This supplemental amount of hydrogen is not itself critical provided that the total molar ratio of hydrogen, both that used to evaporate the silicon tetrachloride in the flask and that added by way of inlet 26, to the silicon tetrachloride is at least 4 moles of hydrogen per mole of silicon tetrachloride, and preferably 6–8. With 50 liters of supplemental hydrogen per hour admitted through inlet 26, the total molar ratio of hydrogen to silicon tetrachloride is 7.76. Also deoxygenated dry argon, nitrogen or helium can be admitted through inlet 28 at a rate of up to about 50 liters per hour, although this is not critical, lower or higher rates being permissible, provided however that in no case should the molar ratio of hydrogen to silicon tetrachloride be lower than 4, and preferably in the range of 6–8.

The use of the inert diluent gas seems to give a denser deposit of silicon than when an equivalent volume of hydrogen alone is used, but the tested electrical properties of the silicon produced do not vary significantly whether or not the inert gas is used. When the tube seems filled with product, which is substantially when the charge of silicon tetrachloride is nearly all evaporated from the flask 10, the hydrogen streams are cut off, and the system is flushed for two hours with inert gas, argon, helium or nitrogen, and then allowed to cool with a slow flow of inert gas through it. The tube 18 is removed from the furnace, and the charge which is in the form of small granules with occasional larger lumps is removed by gently tapping it in the vertical position. If necessary, a clean fused silica rod about 1 inch in diameter can be used to help loosen deposits which do not drop out easily. It may be necessary to invert the tube end over end to help remove the contents. When the tube has been emptied, except for minor adhesions, it is ready for use again. If a tube is left out of use for longer than is necessary for the required manipulations a fused silica blank flange is clamped to the ends to help keep it clean for the next run. I have also tried partially filling the tube 18 by using a supported fused silica rod one inch in diameter and substantially the full length of tube 18 to provide an annular space approximately one-half inch in diameter for the deposition of silicon, but this has given no noticeable improvement in operating conditions, and has caused an increase in the amount of tube breakage. I have also tried rotating the tube 18 in the furnace by half a turn at daily intervals, but this has not seemed to provide any noticeable advantage. By suitable choice of reactants, such as the purest oxygen-free hydrogen, and carefully redistilled silicon tetrachloride, there may be obtained by this procedure pure elemental silicon having a silicon content in excess of 99.9999%.

When it is necessary to remove the contents from the tube 18 by more vigorous means than merely tapping it, I have used a steel rod about one-half inch in diameter and 3 feet long covered with tantalum sheet to push gently against the contained deposits by gentle tapping from each end as required. By careful manipulation excessive breakage can be avoided. The tubes have a limited life because of the high temperatures required, but with care a life-time of ten or more runs is secured.

If silicon tetrabromide is used as a source of silicon, it has been found that a slightly lower temperature, namely about 1050° C. may be employed. The increasing commercial availability of trichlorosilane, which may be in some instances more easily purified than silicon tetrachloride, suggests the use of this compound as a silicon halide starting material. It has been found that when using trichlorosilane, a temperature of about 1020° C. in the reduction reaction provides good yields.

While I have indicated that reaction tube 18 is preferably made of fused quartz, it will be understood that such reaction vessel may be made of any equivalent material which is inert to the reactants passing through the apparatus.

It will be understood that my invention is not limited to the specific details disclosed, but that modifications and changes may be made in practicing the invention without departing from the spirit and scope of the invention as defined in the appended claims.

I claim:

1. Method for the production of silicon of very high purity which comprises heating a silicon halide in the vapor state with hydrogen, at a temperature between about 900° and about 1200° C., the hydrogen being present in an amount between 4 and about 8 mols per mol of silicon halide, and the time of contact of the reactants being about 15 to 25 seconds, and recovering the liberated silicon.

2. Method for the production of silicon of very high purity which comprises heating a mixture of a silicon halide and hydrogen in an elongated and confined reaction zone at a temperature between about 900° and about 1200° C., the hydrogen being present in an amount between 4 and about 8 mols per mol of silicon halide, and the residence time of the reactants in said reaction zone being about 20 to 25 seconds, and recovering the liberated silicon.

3. Method for the production of silicon of very high purity which comprises heating a mixture of a silicon halide and hydrogen in an elongated and confined reaction zone at a temperature between about 900° and about 1200° C., the hydrogen being maintained at a concentration corresponding to about 6 mols per mol of silicon halide, the residence time of the reactants in said reaction zone being about 20 to 25 seconds, and recovering the liberated silicon.

4. Method for the production of silicon of very high purity which comprises heating a silicon halide in the vapor state with hydrogen, at a temperature between about 1000° and about 1100° C., the hydrogen being present in an amount between 4 and about 8 mols per mol of silicon halide, and the time of contact of the reactants being about 15 to 25 seconds, and recovering the liberated silicon.

5. Method for the production of silicon of very high purity which comprises heating silicon tetrachloride vapor and hydrogen at a temperature between about 900° and about 1200° C., the hydrogen being present in an amount between 4 and about 8 mols per mol of silicon tetrachloride, and the time of contact of the reactants being about 15 to 25 seconds, and recovering the liberated silicon.

6. The method of claim 1 in which the silicon halide is silicon tetrachloride.

7. The method of claim 1 in which the silicon halide is silicon tetrabromide.

8. The method of claim 1 in which the silicon halide is trichlorosilane.

9. The method of claim 3 in which the silicon halide is silicon tetrachloride.

10. Method for the production of silicon of very high purity which comprises slowly heating a mixture of a silicon halide, hydrogen, and an inert gas, at a temperature between about 900° and about 1200° C., the hydrogen being present in an amount between 4 and about 8 mols per mol of silicon halide, the time of contact of the reactants being about 15 to 25 seconds, and recovering the liberated silicon.

References Cited in the file of this patent

UNITED STATES PATENTS

| | | |
|---|---|---|
| 2,406,605 | Hurd | Aug. 27, 1946 |
| 2,893,850 | Von Bichowsky | July 7, 1959 |

FOREIGN PATENTS

| | | |
|---|---|---|
| 659,710 | Great Britain | Oct. 24, 1951 |
| 799,876 | Great Britain | Aug. 13, 1958 |

OTHER REFERENCES

Mel'nikov: Article in "Zhur. Neorg. Khim.," vol. 2, pp. 233–7, May 1957.

Parravano et al. in "Chemical Abstracts," vol. 17 (1923), p. 3651.

Fiat Final Report 789, "Experiments to Produce Ductile Silicon," April 1946, pages 1–3.